March 28, 1967   J. H. DUNCAN ETAL   3,311,185
SYMMETRIZING BIPIVOTAL COUPLING DEVICE
Filed Jan. 25, 1965   2 Sheets-Sheet 1

JAMES H. DUNCAN
CHAUNCEY J. KRAUS
INVENTORS

Huebner & Worrel
ATTORNEYS

JAMES H. DUNCAN
CHAUNCEY J. KRAUS
INVENTORS

United States Patent Office 3,311,185
Patented Mar. 28, 1967

3,311,185
SYMMETRIZING BIPIVOTAL COUPLING
DEVICE
James H. Duncan, Gilroy, and Chauncey J. Kraus,
Modesto, Calif., assignors to Air-O-Fan Products Corp.,
a corporation of California
Filed Jan. 25, 1965, Ser. No. 427,562
1 Claim. (Cl. 180—14)

The present invention relates to a symmetrizing bipivotal coupling device and more particularly to such a device adapted to connect a towed vehicle having mechanically power-operated elements to a prime mover and maintaining the vehicle and prime mover in symmetrical relation so that the operative elements can be powered through a mechanical power takeoff from the prime mover and operated continuously during turning maneuvers.

In the use of towed vehicular apparatus having elements operable by mechanical power sources, it has been a practice to mount a separate power source on the apparatus to avoid the problem of transmitting power from the draft vehicle. Such apparatus has proved bulky, difficult to maneuver, and costly and inconvenient to operate, due to the additional structure of the separate power system. This has been true in the use of numerous types of mobile mechanically operated equipment, such as choppers, balers, sprayers and the like. However, the present invention will be conveniently described in an embodiment of a mobile spray apparatus, as an illustrative operational environment.

In the development of such an apparatus, attempts to incorporate a mechanical power takeoff from a prime mover have been hindered by the difficulties of maintaining inter-vehicle symmetry, directional stability and synchronous control of the apparatus during its movement by the prime mover. For example, with the use of a mechanical power takeoff, an auxiliary shaft would have obvious advantages. However, such a shaft must be mounted by means of a universal connection at each end, one connection at the prime mover, on draft vehicle, and the other at the apparatus itself. Such a linkage obviously gives an uncontrolled bipivotal shaft connection, which leads to the above operational difficulties. During movement of the apparatus directional stability and synchronous control are impossible to achieve since the apparatus in following the prime mover tends to wander from side to side out of control. Furthermore, during turning movements, inter-vehicle symmetry is impossible, since one universal connection may be bent to an excessive turning angle while the other connection is bent not at all, thus obstructing the rotation of the shaft and causing a power shutdown. Although by use of Hooke's-type universay joints it is possible to achieve continuous constant-velocity operation of a coupling shaft even for unequal angles, this is not always true for sharp turns during which the turning angle approaches 90° at one joint. Furthermore, the cost of Hooke's-type universal joints renders them economically unfeasible for many apparatus. In addition, with an uncontrolled bipivotal shaft linkage it is practically impossible for the prime mover to move the apparatus backward without causing wandering or complete stoppage of movement.

Therefore, it is an object of the present invention to provide a symmetrizing bipivotal coupling device.

Another object is to provide such a device adapted to connect a towed vehicle to a prime mover and synchronously to maintain the vehicle and prime mover in symmetrical relation with respect to the coupling device during all movements, including relative angular displacement.

Another object is to provide such a device for a vehicle having mechanically operable apparatus thereon and which eliminates the need for a separate power unit mounted on the vehicle.

Another object is to provide such a device which allows incorporation of a mechanical power-takeoff linkage connecting the apparatus to the power system of the prime mover, thereby enabling the apparatus for continuous operation during all turns, within a range of relative angular movement of 90° between the prime mover and the trailing, or towed, vehicle, measured on either side of the longitudinal axis of the prime mover between a first position of alignment with the longitudinal axis of the trailing vehicle and a second positioin angularly displaced from the first.

Another object is to provide such a device which allows synchronous directional control of the apparatus.

Another object is to provide such a device which insures maintenance of directional stability of the apparatus.

Another object is to provide such a device which functions equally effectively during either backward or forward movement of the apparatus.

Another object is to provide such a device which symmetrically equalizes the angular orientation of the respective universal connections of the power takeoff linkage so that each connection is maintained at an operable angle.

Another object is to provide such a device which allows the prime mover and apparatus to make sharp turns and conveniently to maneuver so as to reverse direction of movement along adjacent paths, such as rows of crops in a field.

Another object is to provide such a device which is easy to connect and disconnect.

Further objects and advantages will become apparent in the subsequent description in the specification and the drawings.

Figure 1:
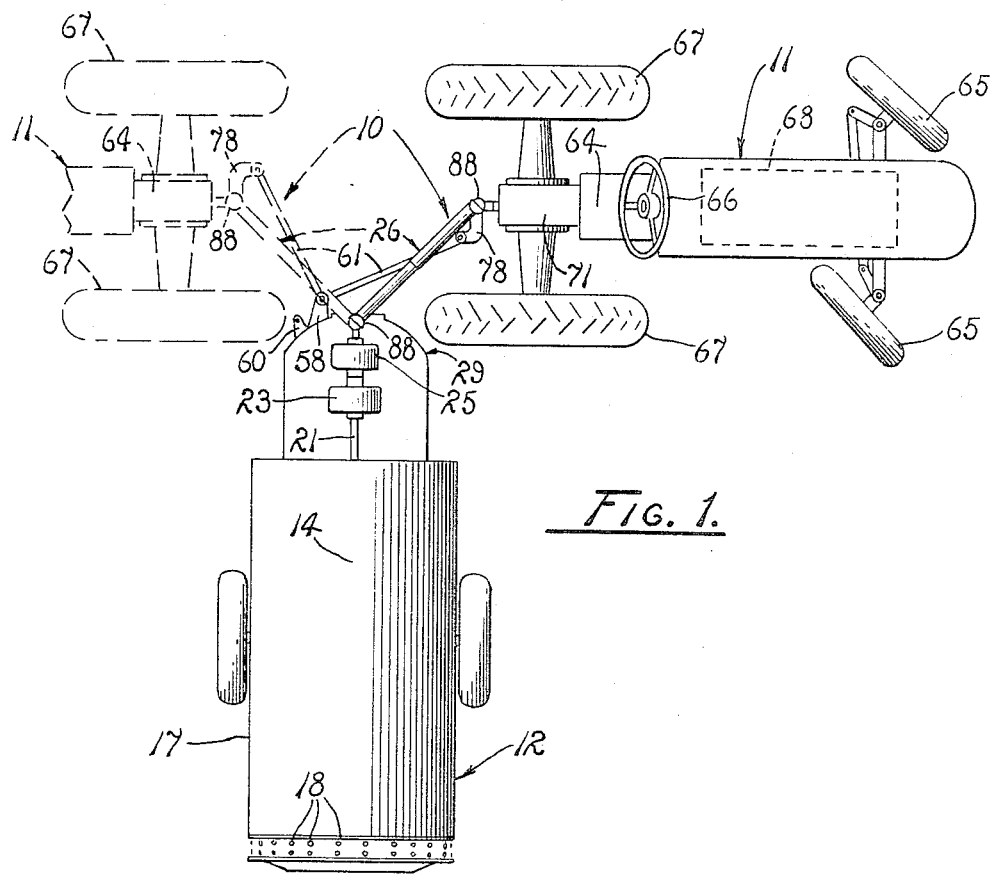
FIG. 1 is a plan view of the coupling device of the present invention connected between a spray apparatus and a prime mover, as a draft vehicle, which is shown in left and right 90° turning positions respectively.

Referring more particularly to the drawings, the bipivotal coupling of the present invention is shown generally at 10 in connection with a typical environment consisting of a tractor 11, as a prime mover or draft vehicle, and a spraying apparatus 12, as a drawn, or towed vehicle. For ease of illustration the tractor and coupling are shown in both left and right 90° turning positions respectively.

The spraying apparatus 12 is mounted on a two-wheeled trailer frame 13 having a longitudinal axis 14. A liquid storage tank 17 is mounted on the frame having an elongated fluid-tight tunnel, not shown, extending longitudinally therethrough. The spraying apparatus consists conveniently of an annular array of orifices 18 opening radially outwardly of the apparatus and connected through a suitable fluid tight conduit, not shown, to the storage tank. A pump, not shown, is provided for discharging fluid through the orifices and is conveniently operated by means of a suitable belted connection to the apparatus drive shaft 19, to be described. A fan 20 is mounted adjacent to the orifices and is adapted to disperse discharging fluid radially of the orifices in a finely diffused spray effectively to distribute the spray over the surrounding area.

The fan 20 is driven by means of an elongated shaft 19 connected to the fan and extending forwardly of the tank 17 through the elongated tunnel. The forward end 22 of the shaft is geared and connected to a suitable gear train, not shown, housed in a transmission gear box 22 mounted on the trailer frame 13. An intermediate geared shaft 24 is connected to the gear train and supported in journalled engagement by a pedestal 25. The intermediate shaft has a splined jointure portion, not shown, conveniently disposed at the pedestal and adapted to be connected to a power-takeoff coupling shaft 26, to be described below.

The gear box 23 and the pedestal 25 are both mounted on a bearing housing 29, for a drawbar 30, to be described below. The bearing housing consists of an upper and lower plate 31 and 32, respectively, held in spaced parallel relation by an arcuate forward wall 33 and by transverse elements of the frame, not shown. The inner portions 36 of the upper and lower plates each provide a suitable bearing surface 37 for a roller bearing 38, to be described. An elongated opening 39 is provided in the central portion of the wall and is adapted to accommodate the drawbar 30. Centrally adjacent to the opening, holes 40 are provided in the upper and lower plates respectively and disposed in vertical alignment to receive an upright pivot pin 43. The housing may be reinforced by additional plating 31A as necessary.

An elongated rigid drawbar 30 is disposed through the elongated opening 39, having one end 44 housed therewithin and terminating in a machined and partially threaded cylindrical portion 45 of a smaller diameter than the drawbar. A roller 38 is mounted for frictionless rotation on the bearing surface 37, and is secured by means of a threaded nut 47 and suitable washers 48. The peripheral surface 50 of the roller is preferably of a durable resilient material, such as rubber, to provide a firm unabrasive contact with the respective bearing surfaces 37.

A hole 51 is provided diametrically through the drawbar 30 in alignment with holes 40 for reception of the pivot pin 43. The drawbar is secured thereby for free pivotal movement about the upright axis of pin 43.

A tongue 52 is secured to the free end of the drawbar 30 and is perforated to receive an upright pivot pin 54.

An auxiliary bracket 57 is attached to the side of the drawbar 30, adjacent to the tongue 52, and is perforated to receive a substantially upright pin, not shown.

A bracket 58 is mounted on the wall 33 laterally of the elongated opening 39 and on the same side of the drawbar 30 as the auxiliary bracket 57. The bracket projects forwardly of the trailer 13 and is perforated to receive a substantially upright threaded pivot pin 59 forwardly and laterally of the pivot pin 43. The preferred positioning of the pin 59 relative to the pin 43 will be described below.

Figure 3:
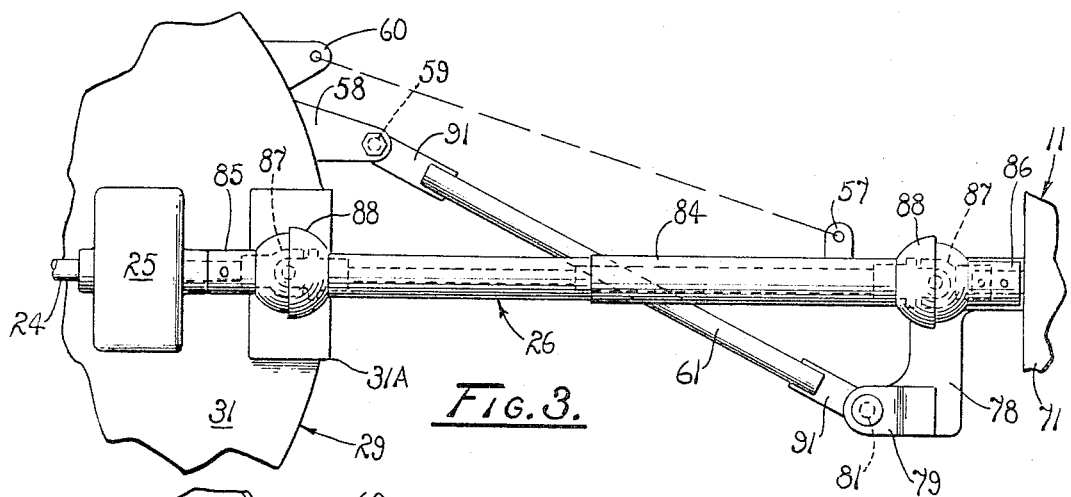
FIG. 3 is a somewhat enlarged plan view of the device of FIG. 1.
Figure 4:
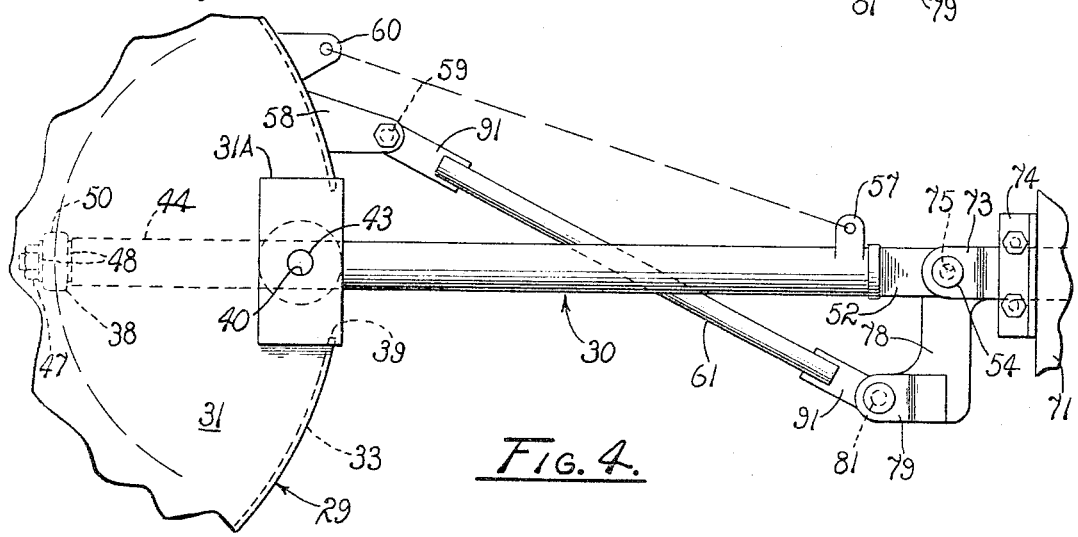
FIG. 4 is similar to FIG. 3, except that the power-takeoff shaft and related elements have been broken away to show the drawbar.

A perforated bracket 60 is mounted on the wall laterally outwardly of the bracket 58 and projects forwardly of the trailer. The relative disposition of the brackets 57 and 60 is such that with the drawbar aligned with the longitudinal axis 14 of the apparatus 12 the distance between the perforated portions of the respective brackets is equal to the length between pivot points of an auxiliary coupling bar 61, to be described. Further, in such disposition, the forward pivot pin 54 of the drawbar is in alignment with the perforations of portions 57 and 60, as shown in FIGS. 3 and 4, and the line of alignment is in oblique relation to the drawbar.

The tractor 11 has a longitudinal axis 64 and front wheels 65 steerable by conventional steering linkage controlled through a steering wheel 66. Enlarged rear wheels 67 are mounted on the tractor and adapted to be driven by the tractor power system for imparting motion to the tractor. The power system consists of a conventional engine 68 connected through suitable shafts and gears, not shown, to the enlarged wheels. A housing 71 contains power transmission gearing. A seat 72 is provided for an operator, not shown.

A power-takeoff gear, not shown, is connected within the housing 71 to the power transmission gearing of the vehicle and provides a conventional splined jointure portion, not shown, disposed rearwardly of the gear housing. The splined portion is adapted to be connected to the power-takeoff shaft 26, to be described, leading to the spray apparatus 12. A suitable clutch, not shown, is provided for connecting the takeoff shaft to the power system.

A yoke bracket 73 is mounted on the rear of the tractor 11 in any suitable manner, such as by bolted connection 74. The yoke provides aligned holes 75 for receiving a pivot pin 54 in a substantially upright position. The tongue 52 of the drawbar is secured for pivotal movement in the yoke bracket by means of the pivot pin 54. A second bracket 78 is attached to the yoke bracket, as by welding, and provides a perforated yoke portion 79 for accommodating a pivot pin 81 in a substantially upright position. The preferred positioning of the pivot pin 81 relative to the drawbar pin 54 will be described below.

Figure 2:
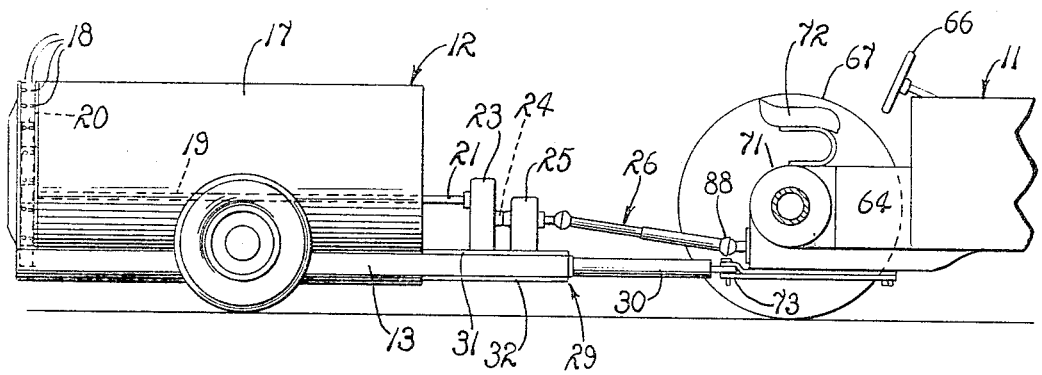
FIG. 2 is a side elevation showing the device of FIG. 1 aligned with the direction of movement of the prime mover.

An elongated power-takeoff coupling shaft 26 connects the splined jointure portion of the tractor takeoff gear, not shown, to the splined jointure portion of the intermediate shaft 24. The power takeoff shaft consists of an elongated telescopic portion 84 having an internal splining, not shown, to insure its integral rotation. At its opposite ends are splined segments 85 and 86 connected to the main portion by means of conventional Hooke's-type universal joints 87 contained within respective ball-and-socket housings 88. The splined ends, not shown, are seated respectively in the splined portions of the intermediate shaft and the power takeoff gear and secured by suitable lock pins, not shown. When so connected, the shaft is disposed with the pivotal axes of its universal joints in respective elevational alignment with the pivot pins 40 and 54. As shown in FIG. 2, the power-takeoff shaft is disposed preferably above the drawbar 30, although, depending upon the structure of the towed apparatus, it is also possible to reverse this arrangement.

Figure 5:
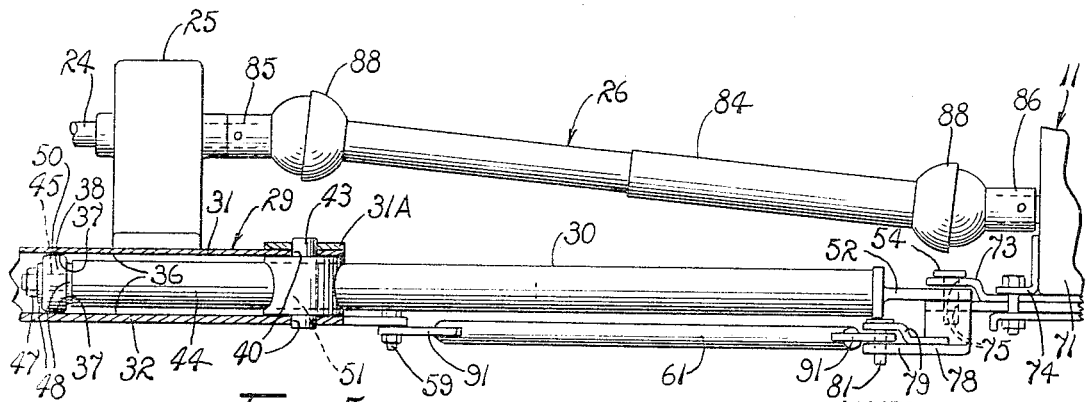
FIG. 5 is a side elevation of the device of FIG. 3 showing the drawbar bearing housing in section.

As shown in FIGS. 3, 4, and 5, an elongated rigid auxiliary coupling bar 61 interconnects the brackets 58 and 78. The auxiliary bar has at each end a horizontally disposed tongue 91 perforated for receiving the pins 59 and 81 respectively. One tongue is inserted in the yoke 79 and secured therein by the pin 81. The opposite tongue is connected to the bracket 58 by means of the pin 59. The pin 59 is secured by the lock nut 94 and allows free pivotal movement of the auxiliary bar.

*Operation*

The operation of the present invention is believed to be clearly apparent and is briefly summarized at this point. Prior to operation of the spray apparatus 12, the drawbar 30 and the auxiliary bar 61 are connected between the tractor 11 and apparatus as described above. The splined ends of the power takeoff shaft 26 are connected respectively to the corresponding splined portions of the intermediate shaft 24 of the apparatus and the tractor power system gear and secured by the lock pins. After starting the tractor engine 68, the takeoff shaft is caused to rotate by engagement of the clutch, not shown. As the takeoff shaft rotates, it transmits power to the operative elements of the apparatus causing them to commence operation as described above.

During operation, the tractor is driven along a predetermined path, such as a row of crops, not shown, and movement is imparted to the trailer 13 and spray apparatus 12 by means of the bipivotal drawbar 30. The auxiliary bar 61 alternately experiences tension and compression in cooperation with the drawbar and serves to maintain the longitudinal axes 14 and 64 of the apparatus and the tractor respectively in constant symmetrical relation to the longitudinal axis of the drawbar. In this manner, the combined linkage prevents the apparatus from wandering from side to side out of control and thereby affords directional stability. Tipping or pitching of the apparatus on its two-wheeled trailer frame is prevented by means of the roller bearing 38 and the confinement of the drawbar within the bearing housing 29, which prevents the forward portion of the apparatus from dropping below the level of the drawbar.

When the tractor is driven rearwardly, similar advantages are realized. The auxiliary coupling bar 61 continues to cooperate with the drawbar 30 in providing continuous directional control with stability and great ease of maneuvering.

During turning movements, the bipivotal linkage of the present invention continues to maintain the longitudinal axes 14 and 64 of the tractor 11 and the apparatus 12 respectively in constant symmetrical relation to the drawbar 30. For instance, for a 90° turn in either direction, as shown in FIG. 1, the longitudinal axes of both vehicles are oriented with the drawbar at equal angles, each of 450°. Obviously, this also maintains operable angles at each universal joint 87 of the power takeoff shaft 26 so that the power system can continue to function efficiently during all such turning movements. Since the respective pivotal axes of the universal joints are disposed in respective elevational alignment with the pivot points 43 and 54 of the drawbar, the angular relationships are the same for each universal joint relative to the respective longitudinal axes of the two vehicles. Therefore, for any degree of turn which may be effected by the two vehicles the angular orientation at the universal joints are such that continuous powered operation is maintained. This is true whether the direction of movement be forward or backward.

The basic principle of the present invention affords some leeway in the positioning of the auxiliary coupling bar 61 relative to the drawbar 30. However, it has been found by empirical methods that for a drawbar 38 inches long between pivot points 43 and 54 the coupling device functions especially well when the pivot pin 59 of the auxiliary bar is disposed 7½ inches laterally of the corresponding pivot pin 43 of the drawbar and 5 inches forwardly thereof. The relative positions achieved by such dimensions are shown in FIG. 4. At the same time, the pivot pin 81 of the auxiliary bar is disposed 7½ inches laterally oppositely of the drawbar from the pivot pin 59 and 4 inches rearwardly of the corresponding pivot pin 54 of the drawbar. It has been found that better results are obtained by varying the respective longitudinal distances in this manner, since when the two longitudinal distances are equal, the directional control becomes unstable upon turning in one direction beyond a certain angle.

In traveling position, the auxiliary bar 61 is removed from its bipivotal operative position and attached between the brackets 57 and 60, as shown schematically in FIGS. 3 and 4. By this attachment the pivotal movement of the trailer 13 relative to the tractor 11 is limited to a single pivot point at the pivot pin 54. Since the power system is rendered inactive during traveling, there is no need to maintain equal angles at the respective universal joints 87 and, therefore, the single pivot point allows effective directional control for travel on the highway.

It can be observed from the foregoing that a coupling device has been provided which allows towing a mechanically operable vehicular apparatus by a prime mover without need for mounting a separate power system on the apparatus itself. The bipivotal coupling device provided by the invention gives complete directional stability, efficient synchronous control for both forward and rearward directions of movement, and convenience of operation. For whatever degree of turning movement, the angular orientation at each universal joint is maintained symmetrically equal so that the power takeoff system is allowed to function continuously. By this symmetrization the need for more expensive constant-velocity-type universal joints is eliminated. Furthermore, greater turning angles are made possible even with such joints.

While the invention has been illustrated and described in what is at the present regarded as a practical and preferred embodiment, it is recognized that departures may be made therefrom within the scope of the invention, which is not to be limited to the details disclosed herein but is to be accorded the full scope of the claim so as to embrace any and all equivalent methods and processes.

Having described our invention, what we claim as new and desire to secured by Letters Patent is:

In a power-operable apparatus having a longitudinal axis and forward and rearward ends, said apparatus being adapted to be moved by a powered prime mover having a longitudinal axis and forward and rearward ends, a bipivotal coupling comprising an elongated rigid drawbar having a longitudinal axis, opposite first and second ends respectively, and a mid-point, said first end having a tongue providing a substantially vertical hole, said second end having a roller adapted for substantially frictionless rotation about an axis aligned with the longitudinal axis of the drawbar, said drawbar having an intermediate substantially vertical hole disposed between the second end and said mid-point in spaced relation to said roller; a bearing housing mounted on the forward end of the apparatus having a pair of bearing plates disposed in substantially horizontal spaced relationship and adapted to accommodate the second end of said drawbar therebetween with the roller in rolling engagement with one of said plates, said bearing housing supporting a substantially upright pivot pin disposed between the plates at the forward end and on the longitudinal axis of the apparatus, said second end of the drawbar being disposed between the plates with said pivot pin disposed through the intermediate hole in the drawbar to secure said drawbar for pivotal movement thereabout in a substantially horizontal plane; a first pivot pin pivotally connecting the first end of the drawbar on the rearward end of the prime mover for free pivoted movement thereabout, a second pivot pin disposed laterally adjacently of the first pin on the rearward end of the prime mover rearwardly thereof and at a lower elevation than said first pin; a bracket mounted on the forward end of the apparatus adjacently of the bearing-housing pivot pin and laterally oppositely thereof from the second pivot pin, said bracket supporting a substantially upright pivot pin disposed forwardly of the bearing-housing pin laterally thereof and at a lower elevation than said bearing-housnig pin; an elongated auxiliary coupling bar, said auxiliary bar being pivotally mounted between said second pivot pin and said bracket, said auxiliary bar being disposed beneath said drawbar and in spaced relation thereto; mechanical power-takeoff means mounted on the rearward end of the prime mover on the longitudinal axis thereof and adapted to transmit power from the prime mover to a rotatable shaft; mechanical power-receiving means mounted on the forward end of the apparatus on the longitudinal axis thereof and adapted to receive power from a rotatable shaft connected to the power-takeoff means of the prime mover; a power-takeoff shaft having a central elongated portion and opposite ends, said opposite ends being connected respectively to the power-receiving means on the apparatus and the power-takeoff means on the prime mover, said opposite ends being connected respectively to the central portion by means of universal joints, said universal joints being disposed substantially in elevational alignment above the bearing-housing pivot pin and the first pivot pin respectively, said power-takeoff shaft being adapted to transmit power from the prime mover to said apparatus incident to operation thereof, said drawbar and said auxiliary bar cooperating during movement of the apparatus by the prime mover to maintain the respective longitudinal axes of the prime mover and the apparatus in horizontally substantially symmetrical relation to the power-takeoff shaft.

References Cited by the Examiner

UNITED STATES PATENTS

| | | | |
|---|---|---|---|
| 1,429,734 | 9/1922 | Hoffman | 280—458 X |
| 1,758,951 | 5/1930 | Johnson | 280—458 |
| 2,603,502 | 7/1952 | Hilblom | 280—458 |

FOREIGN PATENTS

| | | |
|---|---|---|
| 803,274 | 4/1951 | Germany. |
| 889,117 | 9/1953 | Germany. |
| 613,927 | 12/1960 | Italy. |

MILTON BUCHLER, *Primary Examiner.*

BENJAMIN HERSH, *Examiner.*

C. C. PARSONS, *Assistant Examiner.*